United States Patent
Gruenewald et al.

(10) Patent No.: US 6,276,641 B1
(45) Date of Patent: Aug. 21, 2001

(54) ADAPTIVE FLOW BODY

(75) Inventors: Michael Gruenewald, Hoehenkirchen; Clemens Moeser, Munich; Josef Steigenberger, Bad Toelz; Guenther Mueller, Maitenbeth, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/440,851

(22) Filed: Nov. 16, 1999

(30) Foreign Application Priority Data

Nov. 17, 1998 (DE) .............................................. 198 52 944

(51) Int. Cl.[7] ...................................................... B64C 3/48
(52) U.S. Cl. ........................... 244/213; 244/217; 244/219
(58) Field of Search .................................... 244/213, 214, 244/215, 216, 217, 219, 75 R, 113

(56) References Cited

U.S. PATENT DOCUMENTS

| | | | |
|---|---|---|---|
| 2,152,029 | * 3/1939 | Cone | 244/219 |
| 2,192,872 | * 3/1940 | Tampier | 244/219 |
| 4,717,097 | * 1/1988 | Sepstrup | 244/217 |
| 5,839,698 | * 11/1998 | Moppert | 244/217 |
| 6,079,672 | * 6/2000 | Lam et al. | 244/217 |

FOREIGN PATENT DOCUMENTS

| | | |
|---|---|---|
| 2026054 | 12/1970 | (DE) . |
| 19643222A1 | 4/1998 | (DE) . |
| 410571 | * 5/1910 | (FR) . |

* cited by examiner

Primary Examiner—Galen L. Barefoot
(74) Attorney, Agent, or Firm—Crowell & Moring, L.L.P.

(57) ABSTRACT

An adaptive flow body is provided whose profile can be adapted to different operating requirements regarding lift and crosswinds, flow resistance, and steering. The rear part of the flow body is divided into two rear partial profiles by a slot that penetrates from the trailing edge toward the middle part in the lengthwise direction of the flow body profile. These rear partial profiles each also have a flexible inner skin and flexible outer skins fastened continuously on the middle part. An actuator with pushing or pulling movements acts on each inner skin, which movements are transmitted by joints from the inner skin to internal structural elements which transmit these movements through rigid connections as bending moments to the outer skin. The adaptive flow body has a rigid middle part, a forward leading part, and a rear trailing part fastened thereto, with flexible cladding that covers the leading and trailing edges, and structural elements located in the front or rear parts and driven by actuators which act on the flexible cladding.

20 Claims, 5 Drawing Sheets

ADAPTIVE FLOW BODY

BACKGROUND AND SUMMARY OF THE INVENTION

This application claims the priority of German application 198 52 944.9, filed in Germany on Nov. 17, 1998, the disclosure of which is expressly incorporated by reference herein.

The invention relates to an adaptive flow body, especially an aircraft wing, with a variable wing profile, including a rigid middle part and leading and trailing edges fastened thereto, with a flexible cladding covering the front and/or rear parts, and structural elements mounted in the front and/or rear parts driven by actuators which act on the flexible cladding.

To adapt an aircraft wing in terms of its lift, flow resistance, and controlling effect to various flight states such as takeoff, cruising, maneuvering, and landing phases, various solutions are known that are based on an adaptive change in the profile of the wing itself. The wings are therefore partially provided with flexible cladding which is acted upon inside the wing through actuators using adjustable structural elements.

In an adaptive wing of this type described in German Patent Document No. DE-A1-196 43 222 corresponding to pending U.S. patent application Ser. No. 08/954,198, filed Oct. 20, 1997, the rear flexible area of the wing has its camber changed by means of adjusting bodies curved in their lengthwise axes, by rotating the adjusting bodies around their lengthwise axes. The adjusting bodies are provided over their lengthwise axes with variable cross sections so that the local cross section of the adjusting body corresponds to the profile thickness of the wing. Each adjusting body is in contact at least areawise with the flexible cladding, directly and/or by a thin sliding layer. The tilting moments that appear in the adjusting bodies that are mounted on one side require costly mounting whose arrangement uses the rigid spar of the wing. The flexible cladding is connected with the rigid forward part of the wing by bolts. The wing can be adapted to various operating states by the known solution only by changing the camber of the wing profile. Changing the camber allows the lift and flow resistance of a wing to be influenced and no additional controlling effects can be achieved in this manner.

Another wing is known from German Patent Document No. DE-A-20 26 054 with a variable wing profile camber. For this purpose, flexible cladding is provided in the front and rear areas of the wing on which rib parts act to change the camber of the wing, said ribs being pivotably mounted on the spar of the wing and driven by actuators to perform a pivoting effect. In addition to the pivotable rib parts, struts mounted with articulation act on the flexible cladding to maintain the wing profile cross section with changing camber. These struts are connected with articulation to the flexible cladding on the one hand and with articulation to the rigid receptacles for the pivotable rib parts on the other. No actuators act on the struts; their positions are altered by the connection of the cladding with the pivoting of the rib parts and they act as supporting elements only. As in the prior art described above, in this wing as well, the rib parts acting as adjusting bodies are mounted on the rigid spar. The flexible cladding has discontinuities at the transitions to the rigid cladding, in the form of movable bearings, and the wing can be adapted only in terms of its camber.

A goal of the invention is to create an adaptive flow body whose profile can be adapted to different operating requirements involving lift and crosswind, flow resistance, and control.

This goal is achieved according to the invention by providing an adaptive flow body including a rigid middle part and leading and trailing edges fastened thereto, with a flexible cladding covering the front and/or rear parts, and structural elements mounted in the front and/or rear parts driven by actuators which act on the flexible cladding, wherein the rear part is divided into two rear partial profiles by means of a slot that begins at a trailing edge and penetrates in a lengthwise direction of the flow body profile toward the middle part, wherein these rear partial profiles each also have a flexible inner skin, wherein flexible outer skins are fastened continuously to the middle part, wherein an actuator acts on each inner skin with pushing or pulling movements transmitted by joints from the inner skin to inner rear structural elements which transmit these movements through rigid connections as bending moments to the outer skin.

The flow body according to the invention consists essentially of three parts, the leading edge, a rigid middle part adjacent thereto, and a rear trailing edge. The trailing and/or leading edges are each divided into two adjacent forward or rear partial profiles with a slot that begins at the leading or trailing edge and penetrates in the lengthwise direction of the flow body profile to the rigid middle part, said partial profiles being covered by inner skins up to the slot. The inner skins make a transition to the trailing or leading edge in the outer skins of the partial profiles.

The partial profiles have profile camber that can be controlled by actuators that act on their inner skins by pushing and pulling movements. These pushing and pulling movements are transmitted as bending moments to the outer skins by means of structural elements located in the partial profiles, each of which is mechanically connected with articulation with the inner skin and rigidly with the outer skin. As a result, a variable camber which can be individual for each partial profile required can be set as a function of the extent of the pushing and pulling movements.

The invention has the advantage that a combination of differently cambered partial profiles on the rear part permits additional control functions and the achievement of air brake effects without the usual use of control or brake flaps. The actuators can be accommodated almost without any moments in the wing, since the moments of partial profiles that belong together cancel each other out. At the transitions from the front part to the middle part and from the middle part to the rear part, there is a closed outer skin which, with a camber of the partial profiles, has a continuous path of curvature instead of a sharp angle when the flaps are set. Another advantage of the invention consists in the fact that the structural elements that act on the movable outer skins and the actuators do not have to be located in the rigid middle part, for example in a wing spar. As a result, a modular design can advantageously be obtained which allows good maintenance by means of replaceable modules consisting of the partial profiles with their individual actuators and structural elements. The system can be locked in each profile position and secured forcewise with selectable forces to the actuating mechanism with the desired pressure. For adjustment, this force fit can be released or reduced. Advantageously, a choice of different actuators is contemplated. It is contemplated to use hydraulics, a hydraulic motor with a spindle, pneumatics, or mechanical kinematics. No bearings, or only bearings that require little maintenance are required for the actuators and structural elements. One improvement on the invention shows a two-stage design of one of the two rear profile halves. Therefore, it is advantageously possible to provide extra control for the end areas of the profile.

Other objects, advantages and novel features of the present invention will become apparent from the following detailed description of the invention when considered in conjunction with the accompanying drawings.

DETAILED DESCRIPTION OF THE DRAWINGS

Figure 1:
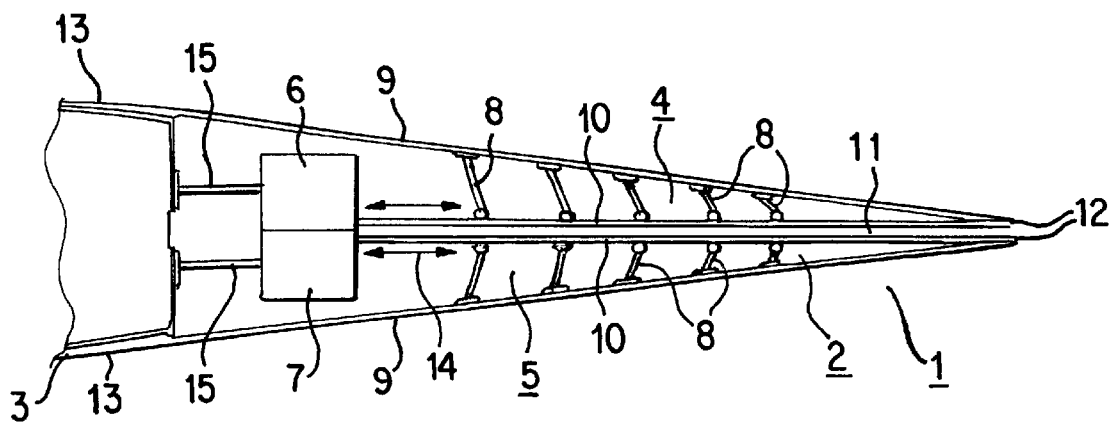
FIG. 1 shows the rear part of an aircraft wing as a block diagram, constructed according to a preferred embodiment of the present invention.

The rear part of an aircraft wing 1 shown in FIG. 1 comprises a rigid middle part 3, a rear part 2 composed of two rear partial profiles 4 and 5, two actuators 6 and 7, and structural elements 8 in the partial profiles. Each partial profile has a flexible outer skin 9 and a flexible inner skin 10 by which it is covered up to a slot 11. The slot divides the rear part into the two rear partial profiles 4 and 5. At the trailing edge 12, the flexible outer and inner skins 9 and 10 merge with one another. The flexible outer skins 9 of the rear partial profiles 4 and 5 are fastened to the rigid middle part 3 by releasable transitions 13.

In each of the rear partial profiles 4 and 5, an actuator 6, 7 acts on the actuator-side end of an inner skin 10 by pushing or pulling movements corresponding to the directional arrows 14. Actuators 6, 7 are secured with releasable stubs 15 on the rigid middle part 3. The releasable transitions 13 and stubs 15 permit easy replacement of the rear partial profiles 4 and 5, for maintenance purposes for example.

The solution according to the invention is not limited to aircraft wings, as shown in the embodiment above. It can be applied generally to bodies with flow around them with their control processes, thus for example to the rudder blades of vessels and adjustable rotors.

Figure 2A:
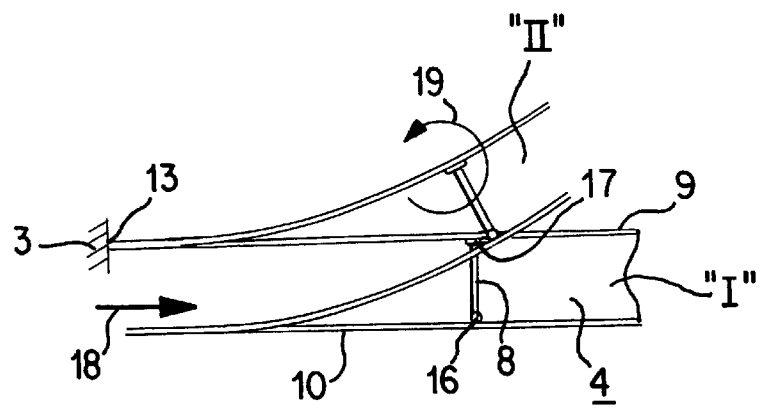
FIG. 2a shows in principle the initiation of force according to the invention into the inner skin of a partial profile and the resultant camber when infinitely rigid structural elements are used in the profile halves.

The principle of the solution according to the invention is shown in FIG. 2a. FIG. 2a includes the two partial images "I" and "II." In partial image "I" there is no introduction of force into the inner skin of a partial profile 4. Partial image "II" uses directional arrow 18 to show a pushing force initiated by an actuator according to the invention into the inner skin 10 of a partial profile 4 and the resultant camber of the partial profile. Partial profile 4 is shown in FIG. 2a partially with only one of its structural elements 8. In partial profiles 4 and 5 all structural elements 8 are mounted with articulations 16 on inner skin 10 and connected by rigid connections 17 with outer skin 9.

The effect of a pulling force or a pushing force as shown on inner skin 10, because of the rigid connection 17 of the structural elements 8 with outer skin 9, produces an influence of bending moments on the outer skin 9 fastened to rigid middle part 3. With a pushing force in the direction of directional arrow 18, the rotational direction of this bending moment is that of the moment arrow 19 shown and a camber of partial profile 4 caused as a result corresponding to partial image "II" of FIG. 2a. When a tensile force is initiated opposite to directional arrow 18, the rotational direction of the bending moment is reversed and the partial profile 4 would have a camber that was opposite to partial image "II."

Figure 2B:
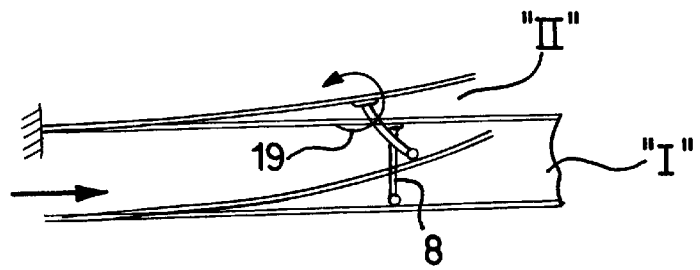
FIG. 2b shows the same principle as in FIG. 2a when using less rigid structural elements.

The degree of camber at a given actuator force can be influenced by the choice of rigidity of structural elements 8. In FIG. 2a, an infinite rigidity must be assumed for structural elements 8. FIG. 2b shows, for the same partial profile and the same degree of force being introduced, the camber that can be achieved for less rigid structural elements 8. The smaller moment arrow 19 indicates that the bending moments that can be introduced into outer skin 9 decrease with the stiffness of the structural elements 8.

Figure 3:
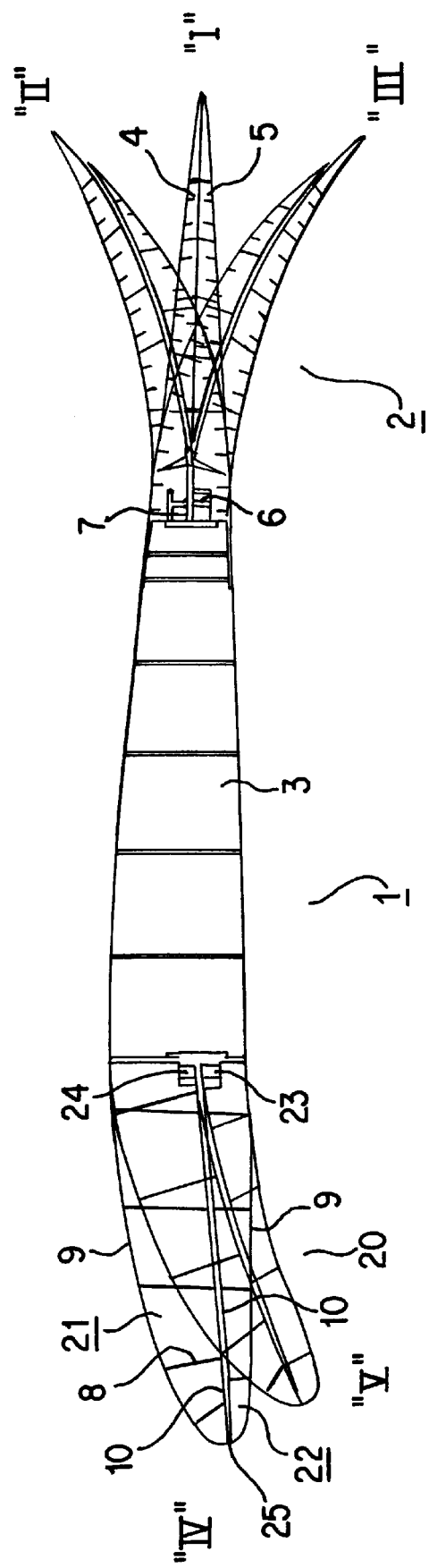
FIG. 3 shows an aircraft wing with adaptive leading and trailing parts, constructed according to a preferred embodiment of the present invention.

The aircraft wing 1 shown in FIG. 3 has in addition to the embodiment shown in FIG. 1, an adaptive front part 20 consisting of forward partial profiles 21 and 22. Forward partial profiles 21 and 22 are designed in accordance with the rear partial profiles 4 and 5 described above with reference to FIG. 1. One actuator 23, 24 works on each of their inner skins 10. The pushing and pulling movements of the actuators, in the solution according to the invention described in FIG. 2a, act through structural elements 8 as bending moments on outer skins 9 of the forward partial profiles and produce a camber of the partial profiles.

In contrast to the rear partial profiles, outer skins 9 of the two forward partial profiles 22 and 21 overlap in the area of leading edge 25. The overlap is located at a distance from the leading edge so that the dynamic pressure at the trailing edge has no effect on the actuating forces of the actuators.

In FIG. 3, various possible operating positions "I" to "V" of the adaptive front and rear parts of the wing are shown. Only a limited choice of additional possible operating positions is involved in this view which can include other degrees of camber as well as cambers opposite one another in partial profiles of the front and rear parts that belong together. A more comprehensive view of the operating positions and their relationship to various types of flight is shown in FIGS. 4a to 4e.

Figure 4A:
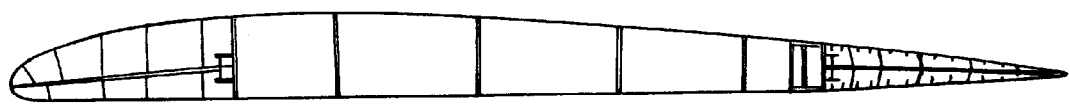
FIG. 4a to FIG. 4e show different operating positions of an aircraft wing according to the invention.
Figure 4B:
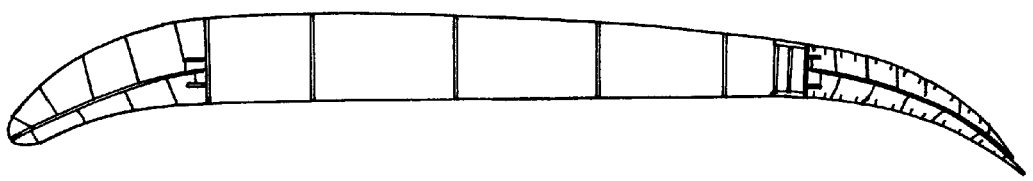
Figure 4C:
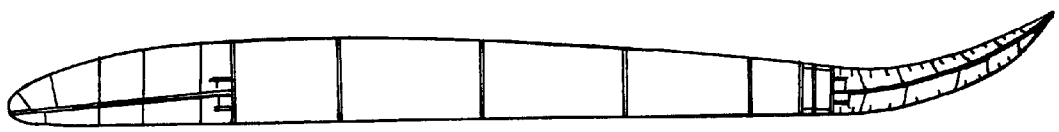
Figure 4D:
Figure 4E:
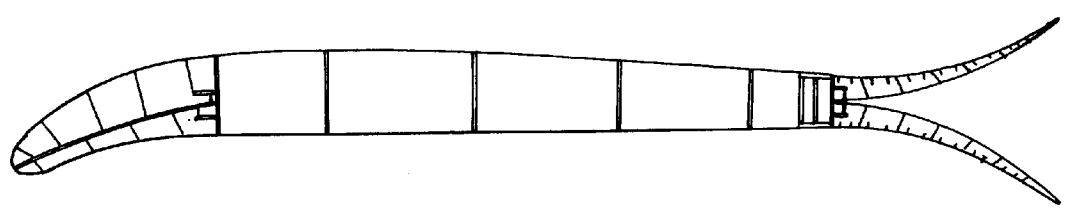

FIG. 4a shows an operating position for a cruising flight, with optimization of the wing with regard to low flow resistance. FIG. 4b shows an operating position to achieve maximum possible lift. With the operating position shown in FIG. 4c, steering effects can be achieved, as in the operating position shown in FIG. 4d, which also offers possibilities for reducing flow resistance and shock location. FIG. 4e shows an operating position that produces a brake flap effect without the usual use of a brake flap.

Figure 5:
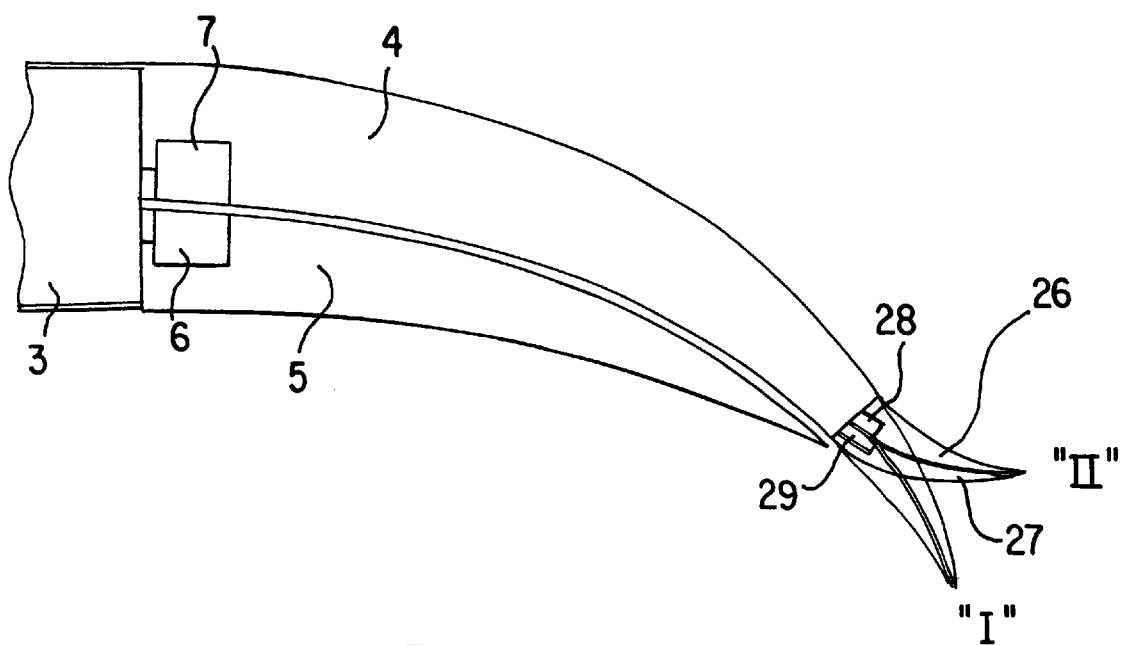
FIG. 5 shows a two-stage design for one of the rear partial profiles of an aircraft wing.

When controlling the lift of an aircraft wing it is conventional to set a trailing flap accordingly. FIG. 5 shows how this flap can advantageously be replaced by an improvement in the solution according to the invention. For this purpose, the rear partial profiles 4 and 5 are made asymmetric so that one of the partial profiles, the upper rear partial profile 4 of an aircraft wing in the embodiment shown, receives at its trailing end, a second stage with additional rear partial profiles 26 and 27 designed according to the invention and steered by separate actuators 28 and 29. In the operating position "II" shown, these additional rear partial profiles are steered so that they assume the function of the set trailing flap. Operation position "I" corresponds to the lift profile without the trailing flap set. The rear partial profiles 4 and 5, as described above, are driven by their actuators 6 and 7; structural elements 8 are not shown in FIG. 5 for reasons of simplification, but as described above regarding rear partial profiles 4 and 5, they are designed and mounted on the skins. The additional rear partial profiles 26 and 27 likewise have structural elements 8 shaped and mounted in this way.

This second stage has the considerable advantage that a drive rod emerging from the middle part for a trailing flap is eliminated. In addition, the advantages listed above are obtained, such as modular replacement and maintenance as well as a nearly zero-moment integration of the actuators.

Figure 6A:
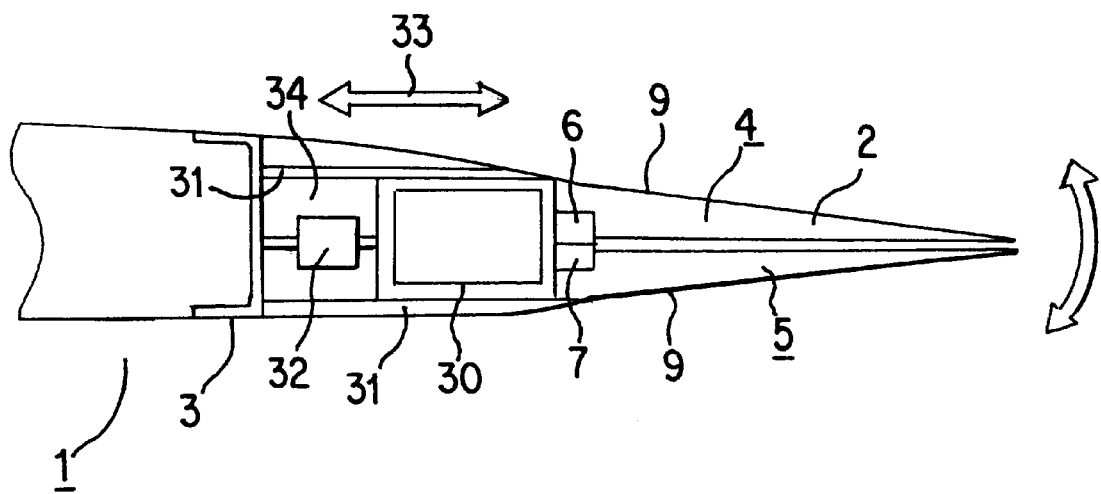
FIGS. 6a and 6b show extendable rear partial profiles to obtain a greater chord length for the landing approach.
Figure 6B:
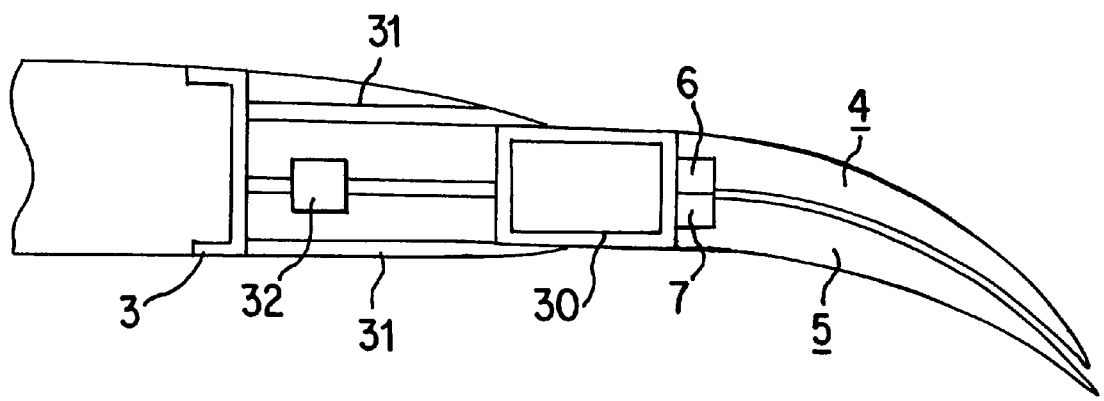

The lift required for a landing approach can be improved by adjusting a larger profile depth, with an adapted sharp camber of the front and rear parts of the wing. The extendable rear partial profiles 4 and 5 shown in FIGS. 6a and 6b serve to obtain more profile depth. The rear partial profiles 4 and 5 themselves are designed in accordance with the solutions described above (the two-stage design is also possible). In contrast to the solutions above, partial profiles 4 and 5 and their actuators 6 and 7 are not received on the rigid middle part 3 but on an extension body 30. Extension body 30 with rear partial profiles 4 and 5 is moved with rear partial profiles 4 and 5 by an actuator 32 guided on tracks 31 in the direction of directional arrow 33. FIG. 6a shows a retracted position of the extension body and FIG. 6b shows an extended position, with the latter increasing the profile depth of the wing for the landing approach.

Tracks 31 are integrated into wing 1 in a rigid rear part projection 34 that continues the wing profile, said extension abutting the rigid middle part 3. The outer skins 9 of the rear partial profiles 4 and 5 that are not labeled in FIGS. 6a and 6b and the actuators 6 and 7 are fastened releasably to the extension body 30. The outer skins are fastened with continuous transitions. In these figures, the structural elements 8 designed in accordance with the solutions described above are disregarded in these figures.

The solution described above with the extension body has the advantage that the drive rods for lift flaps, the so-called "flap tracks," are eliminated that are usually guided externally on the wing and encased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adaptive flow body including a rigid middle part and leading and trailing edges fastened thereto, with a flexible cladding covering the front and/or rear parts, and structural elements mounted in the front and/or rear parts driven by actuators which act on the flexible cladding,
    wherein the rear part is divided into two rear partial profiles by means of a slot that begins at a trailing edge and penetrates in a lengthwise direction of the flow body profile toward the middle part,
    wherein these rear partial profiles each also have a flexible inner skin,
    wherein flexible outer skins are fastened continuously to the middle part,
    wherein an actuator acts on each inner skin with pushing or pulling movements transmitted by joints from the inner skin to inner rear structural elements which transmit these movements through substantially rigid connections as bending moments to the outer skin.

2. Flow body according to claim 1, wherein the front part is divided into two front partial profiles, and
    wherein front actuators act with pushing or pulling movements on each inner skin of the front partial profiles, said movements being transmitted by front structural elements connected with articulation to the inner skins and rigidly attached to the outer skins in the front partial profiles as bending moments to the outer skins of the respective front partial profiles.

3. Flow body according to claim 2, wherein the outer skins of the front partial profiles overlap in an area of a leading edge.

4. Flow body according to claim 1, wherein the outer skins and the actuators are connected releasably with the rigid middle part and have no opening or discontinuity at the rigid middle part.

5. Flow body according to claim 2, wherein the outer skins and the actuators are connected releasably with the rigid middle part and have no opening or discontinuity at the rigid middle part.

6. Flow body according to claim 3, wherein the outer skins and the actuators are connected releasably with the rigid middle part and have no opening or discontinuity at the rigid middle part.

7. Flow body according to claim 1, wherein the actuators are designed as hydraulic systems with or without mechanical spindles or as pneumatic or mechanical systems.

8. Flow body according to claim 2, wherein the actuators are designed as hydraulic systems with or without mechanical spindles or as pneumatic or mechanical systems.

9. Flow body according to claim 3, wherein the actuators are designed as hydraulic systems with or without mechanical spindles or as pneumatic or mechanical systems.

10. Flow body according to claim 4, wherein the actuators are designed as hydraulic systems with or without mechanical spindles or as pneumatic or mechanical systems.

11. Flow body according to claim 1, wherein the rear partial profiles are designed with different profile heights,
    wherein the end of the rear partial profile having the greater profile height has a blunted rear end,
    wherein a second adaptive stage with additional rear partial profiles is releasably attached to the blunted rear end, said additional rear partial profiles being cambered by actuators for a displacement of the inner skins of the additional rear partial profiles and a transfer of this displacement as bending moments to outer skins of the additional rear partial profiles by means of further rear structural elements located in these additional rear partial profiles, said further rear structural elements being connected with articulation to the inner skins and rigidly to the outer skins, in different operating positions.

12. Flow body according to claim 2, wherein the rear partial profiles are designed with different profile heights,
    wherein the end of the rear partial profile having the greater profile height has a blunted rear end,
    wherein a second adaptive stage with additional rear partial profiles is releasably attached to the blunted rear end, said additional rear partial profiles being cambered by actuators for a displacement of the inner skins of the additional rear partial profiles and a transfer of this displacement as bending moments to outer skins of the additional rear partial profiles by means of further rear structural elements located in these additional rear partial profiles, said further rear structural elements being connected with articulation to the inner skins and rigidly to the outer skins, in different operating positions.

13. Flow body according to claim 3, wherein the rear partial profiles are designed with different profile heights, wherein the end of the rear partial profile having the greater profile height has a blunted rear end, wherein a second adaptive stage with additional rear partial profiles is releasably attached to the blunted rear end, said additional rear partial profiles being cambered by actuators for a displacement of the inner skins of the additional rear partial profiles and a transfer of this displacement as bending moments to outer skins of the additional rear partial profiles by means of further rear structural elements located in these additional rear partial profiles, said further rear structural elements being connected with articulation to the inner skins and rigidly to the outer skins, in different operating positions.

14. Flow body according to claim 4, wherein the rear partial profiles are designed with different profile heights, wherein the end of the rear partial profile having the greater profile height has a blunted rear end, wherein a second adaptive stage with additional rear partial profiles is releasably attached to the blunted rear end, said additional rear partial profiles being cambered by actuators for a displacement of the inner skins of the additional rear partial profiles and a transfer of this displacement as bending moments to outer skins of the additional rear partial profiles by means of further rear structural elements located in these additional rear partial profiles, said further rear structural elements being connected with articulation to the inner skins and rigidly to the outer skins, in different operating positions.

15. Flow body according to claim 7, wherein the rear partial profiles are designed with different profile heights, wherein the end of the rear partial profile having the greater profile height has a blunted rear end, wherein a second adaptive stage with additional rear partial profiles is releasably attached to the blunted rear end, said additional rear partial profiles being cambered by actuators for a displacement of the inner skins of the additional rear partial profiles and a transfer of this displacement as bending moments to outer skins of the additional rear partial profiles by means of further rear structural elements located in these additional rear partial profiles, said further rear structural elements being connected with articulation to the inner skins and rigidly to the outer skins, in different operating positions.

16. Flow body according to claim 1, wherein the rear partial profiles with their actuators are received in an extension body which can be pushed in and out in a rigid rear extension on tracks by means of an extension actuator.

17. Flow body according to claim 2, wherein the rear partial profiles with their actuators are received in an extension body which can be pushed in and out in a rigid rear extension on tracks by means of an extension actuator.

18. Flow body according to claim 3, wherein the rear partial profiles with their actuators are received in an extension body which can be pushed in and out in a rigid rear extension on tracks by means of an extension actuator.

19. Flow body according to claim 4, wherein the rear partial profiles with their actuators are received in an extension body which can be pushed in and out in a rigid rear extension on tracks by means of an extension actuator.

20. Flow body according to claim 7, wherein the rear partial profiles with their actuators are received in an extension body which can be pushed in and out in a rigid rear extension on tracks by means of an extension actuator.

* * * * *